United States Patent Office 2,727,838
Patented Dec. 20, 1955

2,727,838

PROCESS FOR HYDROLYZING DEXTRAN

Raymond S. Dalter, Terre Haute, Ind., assignor to Commercial Solvents Corporation, Terre Haute, Ind., a corporation of Maryland No Drawing. Application November 15, 1952,
Serial No. 320,817

4 Claims. (Cl. 127—36)

My invention relates to an improvement in the production of clinical dextran and more particularly it relates to a new method of hydrolyzing dextran to obtain clinical dextran.

Dextran is a bacterial polysaccharide material formed mainly by bacteria of the genus Leuconostoc as well as by some other microorganisms. Dextran is built up of glucose units condensed into long chains and generally has a very high molecular weight.

It was found in Sweden that dextran was quite useful as a blood volume extender or blood plasma substitute when the long chains of glucose units were assembled into molecules of an average molecular weight of about seventy-five thousand. Such a material is the subject matter of U. S. Patent 2,437,518 by Gronwall and Ingelman, issued March 9, 1948.

As mentioned above dextran as obtained by cultivation of organisms of the genus Leuconostoc has a very high molecular weight and a viscosity in excess of 140 centistokes at 25° C. in 6% aqueous solution. To obtain clinical dextran of an average molecular weight of about 75,000, the crude dextran can be degraded by hydrolysis with acid. Clinical dextran has a viscosity ranging from 2.5 to 3.5 centistokes at 25° C. in 6% aqueous solution and since the viscosity of an aqueous solution of dextran is related to the molecular weight, the hydrolysis of crude dextran to obtain clinical dextran can be accurately controlled by following the decrease in viscosity.

Heretofore, clinical dextran has been produced by hydrolyzing crude dextran directly to a viscosity in the clinical range, i. e. 2.5 to 3.5 centistokes at 25° C. in 6% aqueous solution. Following hydrolysis, the dextran is fractionally precipitated with methanol to remove the low molecular weight portion and the high molecular weight portion and thus obtain a more homogeneous clinical fraction. This prior process is described in U. S. Patent 2,437,518 mentioned above.

By using the above process and hydrolyzing a 6% solution of crude dextran directly to a viscosity within the clinical range, yields up to about 26% clinical dextran based on the crude dextran starting material can be obtained.

I have now discovered a process for hydrolyzing crude dextran to obtain clinical dextran resulting in yields of clinical dextran up to as high as 40% based on the crude dextran starting material and it is an object of my invention to provide a process for hydrolyzing crude dextran resulting in the formation of clinical dextran in very much higher yields than have heretofore been possible.

It is a further object of my invention to provide a more economical hydrolysis step in a process for producing clinical dextran.

It is a still further object of my invention to provide a process whereby a great increase in quantities of dextran available for use in the treatment of victims of shock, loss of blood, etc. is effected.

I have found that in the normal hydrolysis of crude dextran, a considerable portion of the hydrolyzed material has a molecular weight very much lower than that desirable for a clinical material and a considerable portion has a molecular weight very much higher than that desirable for a clinical material. This being so, it is necessary to fractionally precipitate the hydrolyzed material to obtain a clinical fraction being made up of molecules more nearly approaching the desirable average molecular weight of about 75,000. Upon fractional precipitation and removal of the low molecular weight material, it is obvious that a great portion of the hydrolyzed material is lost completely such material having no utility clinically. The high molecular weight fractions can of course be rehydrolyzed and fractionally precipitated to obtain a further portion of clinical material.

In my new process, I have found that if I interrupt the hydrolysis at a time when the average molecular weight is considerably above the average molecular weight of clinical material I can greatly reduce the amount of low molecular weight dextran produced and by fractional precipitation I can obtain a clinical fraction as well as a very large high molecular weight fraction which can be rehydrolyzed to an average molecular weight closer to that of clinical dextran to obtain an additional clinical fraction and another high molecular weight fraction. The procedure can be repeated a number of times though I have found it impractical to hydrolyze more than three times using any one batch of crude dextran. My process is essentially a step-wise hydrolysis of crude dextran whereby the amount of low molecular weight material having no utility as a blood plasma substitute is greatly minimized.

In carrying out my new hydrolysis process, I prefer to dissolve crude dextran in water to form a 6% solution since I have found that by hydrolyzing dextran in such a solution to specific viscosities, I can thereby maintain the molecular weight of the hydrolyzed material within a specific range. However, any aqueous solution of crude dextran can be employed and it is of course possible to relate the molecular weight to the viscosity so that control of the hydrolysis can be maintained. In addition, I prefer to conduct my new hydrolysis process on dextran in a 6% aqueous solution since clinical dextran is employed for infusion purposes in a 6% aqueous solution and specifications for the clinical material require that it shall have a viscosity within a certain range when in 6% aqueous solution, i. e. 2.5 to 3.5 centistokes at 25° C.

As indicated above, my new hydrolysis process consists essentially in the step-wise hydrolysis of crude dextran whereby the hydrolysis process is interrupted at least once at a point where the viscosity of the hydrolyzed material is in excess of 5 centistokes at 25° C. By thus interrupting the hydrolysis, I can minimize the amount of low molecular weight dextran produced, which low molecular weight material is completely lost as far as clinical application is concerned. I have found that by thus operating my process, I can keep the amount of low molecular weight dextran produced on hydrolysis below about 35% of the crude dextran starting material. My new process therefore consists also in hydrolyzing crude dextran in the manner herein described so that not substantially more than 35% of the crude dextran is converted to material having a molecular weight less than that suitable for use as a blood plasma substitute. After fractionally precipitating dextran having a molecular weight suitable for clinical use, I can rehydrolyze the high molecular weight fraction to a viscosity of 2.5 to 3.5 centistokes and recover additional clinical material as well as a high molecular weight fraction which can be again rehydrolyzed and the operation repeated until the amount of high molecular weight material remaining is too small for practical continuation of the process. In the above description of my process, I have noted that the first high molecular weight fraction can be rehydrolyzed to a viscosity ranging from 2.5 to 3.5 however, if the first hydrolysis is interrupted at a point at which the viscosity is considerably above 5 such as for example 10, I prefer in rehydrolyzing the high molecular weight fraction to again interrupt the hydrolysis at a time when the viscosity is at least 5 centistokes or in excess thereof. By so conducting my new process I am further able to minimize the amount of low molecular weight material produced and consequently increase the amount of clinical dextran obtained. After the second hydrolysis, I can then rehydrolyze the high molecular weight fraction to a viscosity in the range 2.5 to 3.5 centistokes in the usual manner. Generally I have found that it is impractical to interrupt the hydrolysis in the manner stated above more than twice in ultimately reaching the viscosity range of 2.5 to 3.5 centistokes which is the range for clinical material.

In conducting the hydrolysis of crude dextran in accordance with the principles of my invention, the first clinical fraction obtained is not as large as the first clinical fraction which is obtained when the hydrolysis is conducted in accordance with the principles of the prior art, i. e. lowering the viscosity to a range of 2.5 to 3.5 centistokes on the first hydrolysis. However, upon rehydrolysis of the first high molecular weight fraction, the amount of clinical material obtained when the hydrolysis is conducted according to my new process is so much greater than that obtained by the previously employed processes that the total yield of clinical material obtained by my new process is from 40 to 100% higher than the total amount of clinical material obtained by previously known processes.

It is obvious that the principles of my new process can be accomplished in a variety of ways, so that, for example, any of the high molecular weight fractions obtained at any point in the process can be recycled and mixed with fresh crude dextran for subsequent hydrolyses. I intend to include within the scope of my invention all such variations and equivalents which are obvious to those skilled in the arts.

The following examples are offered to illustrate my invention and I do not intend to be limited by the materials, proportions, or procedures employed.

*Example I*

A 94 gm. portion of crude dextran was dissolved in sufficient water to form a 6% aqueous solution and the dextran in solution was then hydrolyzed by adjusting the pH to 2.0 with 5.5 N hydrochloric acid. The temperature of the solution was raised to 95° C. and the hydrolysis allowed to continue until the viscosity had been decreased from 142 centistokes to 10.1 centistokes, the viscosity determinations being made at 25° C. When the viscosity had reached 10.1 centistokes, the hydrolysis was discontinued by cooling the solution and adjusting the pH to 11.0 with 10 N sodium hydroxide. The hydrolyzed dextran was then fractionally precipitated by adding 1230 ml. of methanol which was an amount such that the amount added was 45% of the total of the volume of dextran solution and the volume of methanol added. There resulted the precipitation of 63.2 gm. of high molecular weight material which was removed. The amount of methanol was then raised to 50% of the total of methanol added and volume of dextran solution prior to the first precipitation by adding 135 ml. to precipitate 4.65 gm. of clinical dextran which was reprecipitated from aqueous solution using methanol and dried to obtain 2.8 gm. of dry clinical material. The high molecular weight fraction was then hydrolyzed further in the manner described above to a viscosity of 5.0 centistokes and on fractional precipitation 34.8 gm. of high molecular weight dextran and 11.1 gm. of dried clinical material were obtained. The high molecular weight fraction was then hydrolyzed a third time to a viscosity of 3.0 centistokes to obtain 24.2 gm. of dried clinical material or a total of 38.1 gm. of dried clinical material for the entire process. This amounted to a yield of 40.5% based on the crude dextran employed.

*Example II*

This example is offered for purposes of comparison with the results of Example I since in the experiment of this example involving 65 gm. of crude dextran, hydrolysis was conducted exactly as in Example I except that the first hydrolysis was continued until the viscosity of the dextran solution was 2.84 centistokes and each of the two rehydrolyses were conducted until the viscosity of the high molecular weight materials was 3.0 centistokes. On this experiment, a total of 12.8 gm. of dried clinical dextran were obtained for a yield of 19.6% based on the amount of crude dextran starting material.

*Example III*

In the experiment of this example, hydrolysis of crude dextran was conducted exactly as in Example I except that only the first hydrolysis was conducted until the viscosity reached a value in excess of 5.0 centistokes, e. g. 23.7 centistokes, and the rehydrolysis of the succeeding high molecular weight fractions was conducted until the viscosity reached a value below 5, i. e. 3.5 and 3.0 centistokes respectively. The yield of dried clinical dextran amounted to 36.6%.

*Example IV*

In an experiment conducted as in Example III, except that the first hydrolysis of the crude material was conducted until the solution had a viscosity of 9.5 centistokes, the two succeeding rehydrolyses of the high molecular weight fractions being conducted until the solutions had a viscosity of 2.8 and 3.0 respectively, a yield of 32.2% dried clinical dextran was obtained.

It can be seen from a consideration of the above examples, that my new process results in greatly increased yields of clinical dextran over the yields obtained by previously known processes.

What I claim is:

1. The process for hydrolyzing dextran to obtain a material suitable for use as a blood plasma substitute which comprises hydrolyzing crude dextran in aqueous solution to a viscosity not lower than about 5 centistokes when measured in 6% aqueous solution at 25° C., fractionally precipitating dextran suitable for use as a blood plasma substitute and dextran of a molecular weight in excess of that suitable for use as a blood plasma substitute and rehydrolyzing the high molecular weight material in aqueous solution to a viscosity between 2.5 and 3.5 centistokes when measured in 6% aqueous solution at 25° C. to obtain additional dextran of a molecular weight suitable for use as a blood plasma substitute.

2. A process for hydrolyzing dextran to obtain a material suitable for use as a blood plasma substitute which comprises hydrolyzing crude dextran in aqueous solution to a viscosity in excess of about 5.0 centistokes when measured in 6% aqueous solution at 25° C., fractionally precipitating dextran of a molecular weight suitable for use as a blood plasma substitute and dextran of a molecular weight in excess of that suitable for use as a blood plasma substitute, rehydrolyzing the high molecular weight material to a viscosity not lower than about 5 centistokes when measured in 6% aqueous solution at 25° C., fractionally precipitating dextran of a molecular weight suitable for use as a blood plasma substitute and dextran of a molecular weight in excess of that suitable for use as a blood plasma substitute and rehydrolyzing the high molecular weight material in aqueous solution to a viscosity between 2.5 and 3.5 centistokes when measured in 6% aqueous solution at 25° C. to obtain additional dextran of a molecular weight suitable for use as a blood plasma substitute.

3. In a process for producing clinical dextran, the improvement which comprises hydrolyzing crude dextran in 6% aqueous solution by weight to a viscosity of about 5.0 centistokes when measured at 25° C., fractionally precipitating clinical dextran and high molecular weight dextran, rehydrolyzing the high molecular weight dextran in 6% aqueous solution to a viscosity of from about 2.5 to about 3.5 centistokes when measured at 25° C., fractionally precipitating clinical dextran and high molecular weight dextran, rehydrolyzing the high molecular weight dextran to a viscosity of from about 2.5 to about 3.5 centistokes when measured at 25° C. and fractionally precipitating clinical dextran.

4. In a process for the production of dextran suitable for use as a blood plasma substitute, the improvement which comprises hydrolyzing crude dextran until not substantially more than 35% is converted to dextran having a viscosity in aqueous solution less than 2.5 centistokes when measured in 6% aqueous solution at 25° C., fractionally precipitating dextran of a molecular weight suitable for use as a blood plasma substitute and dextran of a molecular weight in excess of that suitable for use as a blood plasma substitute, rehydrolyzing the high molecular weight material in solution to a viscosity between 2.5 and 3.5 centistokes when measured in 6% aqueous solution at 25° C. to obtain additional dextran of a molecular weight suitable for use as a blood plasma substitute.

References Cited in the file of this patent

UNITED STATES PATENTS

| | | |
|---|---|---|
| 2,437,518 | Gronwall et al. | Mar. 9, 1948 |
| 2,565,507 | Lockwood et al. | Aug. 28, 1951 |

FOREIGN PATENTS

| | | |
|---|---|---|
| 583,378 | Great Britain | Dec. 17, 1946 |

OTHER REFERENCES

Gronwall et al.: Nature, vol. 155, p. 45, January 13, 1945.

Renfrew et al.: Jour. Amer. Pharm. Assn., vol. 38, pp. 177 to 179, April 1949.

Bull et al.: Lancet, pp. 134 to 143, particularly 134 to 138, January 22, 1949.